United States Patent [19]

Tamura

[11] Patent Number: 4,706,993

[45] Date of Patent: Nov. 17, 1987

[54] APPARATUS FOR ADJUSTING POSITION OF SEATBELT WEBBING AT WHICH IT IS RETAINED BY VEHICLE BODY

[75] Inventor: Keiichi Tamura, Aichi, Japan

[73] Assignee: Kabushiki Kaisha Tokai-rika-denki-seisakusho, Japan

[21] Appl. No.: 876,438

[22] Filed: Jun. 20, 1986

[30] Foreign Application Priority Data

Jun. 24, 1985 [JP] Japan .............................. 60-95643[U]

[51] Int. Cl.$^4$ .............................................. B60R 21/10
[52] U.S. Cl. ...................................... 280/808; 280/804
[58] Field of Search ......................... 280/801, 804, 808

[56] References Cited

U.S. PATENT DOCUMENTS 4,056,282 11/1977 Nordh ................................. 280/808
4,547,717 10/1985 Radermacher et al. ............ 280/804
4,597,588 7/1986 Kawai .................................. 280/804

FOREIGN PATENT DOCUMENTS 2344287 3/1975 Fed. Rep. of Germany ...... 280/808

Primary Examiner—John J. Love
Assistant Examiner—Ross Weaver
Attorney, Agent, or Firm—Sixbey, Friedman, & Leedom

[57] ABSTRACT

An apparatus for adjusting the position of a seatbelt webbing fastened to the body of an occupant at which it is retained by the body of a vehicle has a base member secured to the vehicle body, a main shaft rotatably supported by the base member and having an external thread formed on the outer periphery thereof, and a subsidiary shaft secured to the base member and extending parallel to the main shaft. A movable member is thread-engaged with the external thread of the main shaft and slidably fitted on the subsidiary shaft, whereby, as the main shaft rotates, the movable member is prevented from rotating by the connection with the subsidiary shaft but moves along the main and subsidiary shafts through the thread engagement with the main shaft. A guide member which retains the webbing is secured to the movable member. Thus, the position of the webbing at which it is retained by the vehicle body is adjusted.

16 Claims, 5 Drawing Figures

APPARATUS FOR ADJUSTING POSITION OF SEATBELT WEBBING AT WHICH IT IS RETAINED BY VEHICLE BODY

BACKGROUND OF THE INVENTION

1. Field of the Invention

The present invention relates to a webbing retaining position adjusting apparatus employed in a seatbelt system, which is designed to protect an occupant in an emergency situation of the vehicle, and adapted to enable adjustment of the position of the seatbelt webbing at which it is fastened to the body of the occupant seated in the vehicle.

2. Description of the Related Art

Seatbelt systems are generally arranged such that a webbing is wound up from one end thereof into a retractor disposed at the lower part of a center pillar of a vehicle, and the other end portion of the webbing unwound from the retractor is passed over a slip joint mounted at the upper part of the center pillar so that the distal end of the webbing extends toward the body of an occupant. Thus, the occupant can readily fasten the webbing at optimum positions on his shoulder and waist.

Since the slip joint is fixed at a position that conforms to occupants having a standard body size, the position of the slip joint is not suitable for an occupant (e.g., a child) whose body size is extremely different from the standard, and it is preferable to enable the position of the slip joint to be changed in accordance with the body size of each individual occupant.

There have recently been proposed automatic seatbelt systems which enable the webbing to be automatically fastened to the occupant body.

In one type of automatic seatbelt system, a guide rail is disposed in such a manner as to bend at substantially right angles so as to extend from a roof side member of a vehicle to the intermediate portion of the center pillar, and a slider which retains one end of a webbing is moved along the guide rail in the longitudinal direction of the vehicle by means of the driving force from a drive means.

Accordingly, when the slider is positioned on the side of the guide rail which is closer to the front end of the vehicle, a space is provided between the webbing and the seat, so that an occupant can readily seat himself in the seat.

After the occupant has been seated, the slider is moved toward the rear end of the vehicle along the guide rail. When a predetermined position of the slider on the center pillar in the vertical direction of the vehicle is detected by a limit switch or other similar means, the movement of the slider by means of the driving force from the drive means is suspended, thereby allowing the occupant to be brought into a webbing fastened condition.

The limit switch for detecting a position of the slider at which it is to stop is fixed to the guide rail, and it is therefore preferable, in such automatic seatbelt systems also, to enable the position of the limit switch to be changed so that the webbing retaining position is optimized for an occupant whose body size is extremely different from a standard body size.

SUMMARY OF THE INVENTION

In view of the above-described circumstances, it is a primary object of the present invention to provide a webbing retaining position adjusting apparatus which enables the position of the webbing at which it is retained by the vehicle body to be changed in accordance with the body size of each individual occupant seated in the vehicle.

To this end, the present invention provides an apparatus for adjusting the position of a webbing fastened to the body of an occupant at which it is retained by the body of a vehicle, comprising: a base member secured to the vehicle body; a main shaft rotatably supported by the base member and having an external thread formed on the outer periphery thereof; a subsidiary shaft secured to the base member and disposed so as to extend parallel to the main shaft; a movable member slidably connected to the subsidiary shaft and thread-engaged with the external thread of the main shaft, the movable member being movable along the axis of the main shaft while being guided by the subsidiary shaft in response to the rotation of the main shaft; positioning means secured to the movable member and adapted to determine a position of the webbing at which it is retained by the vehicle body; and rotating means for rotating the main shaft.

Accordingly, the movable member can be moved along the axis of the main shaft in a stepless way by rotating the main shaft by the action of the rotating means, so that a part of the webbing which is retained by the movable member can be changed to a given position.

DETAILED DESCRIPTION OF THE PREFERRED EMBODIMENTS

Figure 1:
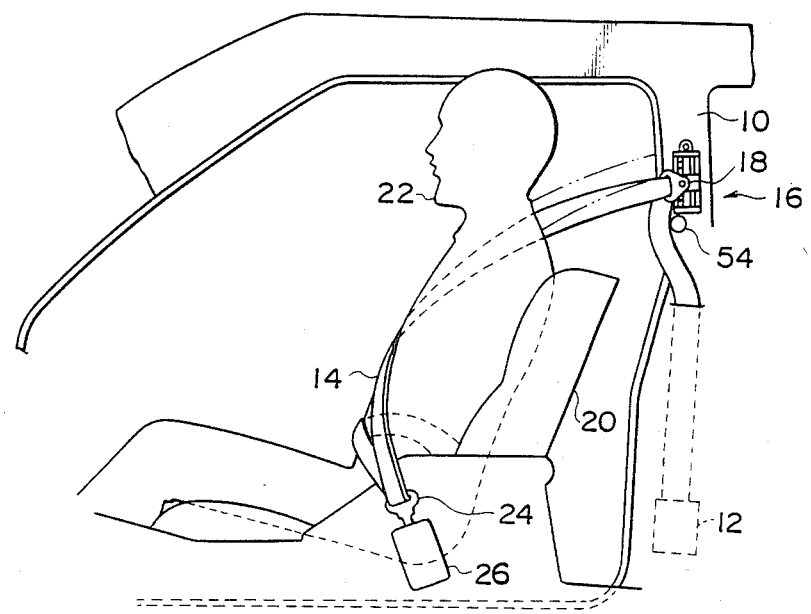
FIG. 1 is a front view of a seatbelt system to which a first embodiment of the webbing retaining position adjusting apparatus according to the present invention is applied, as viewed from one side of the vehicle.

FIG. 1 shows a seatbelt system to which a first embodiment of the webbing retaining position adjusting apparatus according to the present invention is applied.

The distal end portion of a webbing 14 unwound from a retractor 12 disposed at the lower part of a center pillar 10 is passed over a slip joint 18 which is mounted through a retaining position adjusting apparatus 16 to the upper part of the center pillar 10, and is then retained by an anchor plate (not shown) which is secured to the vehicle body. The retractor 12 incorporates an inertia type lock mechanism which instantaneously stops the webbing 14 from being unwound when an emergency situation of the vehicle occurs by sensing it by means of an acceleration sensor.

An occupant 22 seated in a seat 20 engages a tongue plate 24 slidably fitted on a portion of the webbing 14 between the slip joint 18 and the anchor plate with a buckle device 26 which is mounted on the central portion of the vehicle, whereby he can be brought into a so-called three-point seatbelt fastened condition.

More specifically, the occupant 22 can simultaneously fasten a shoulder restraining webbing portion which passes over a position on his shoulders to reach a position on his waist which is located closer to the center of the vehicle and a waist restraining webbing portion which extends from this waist position to a position on his waist on the opposite side.

Figure 2:
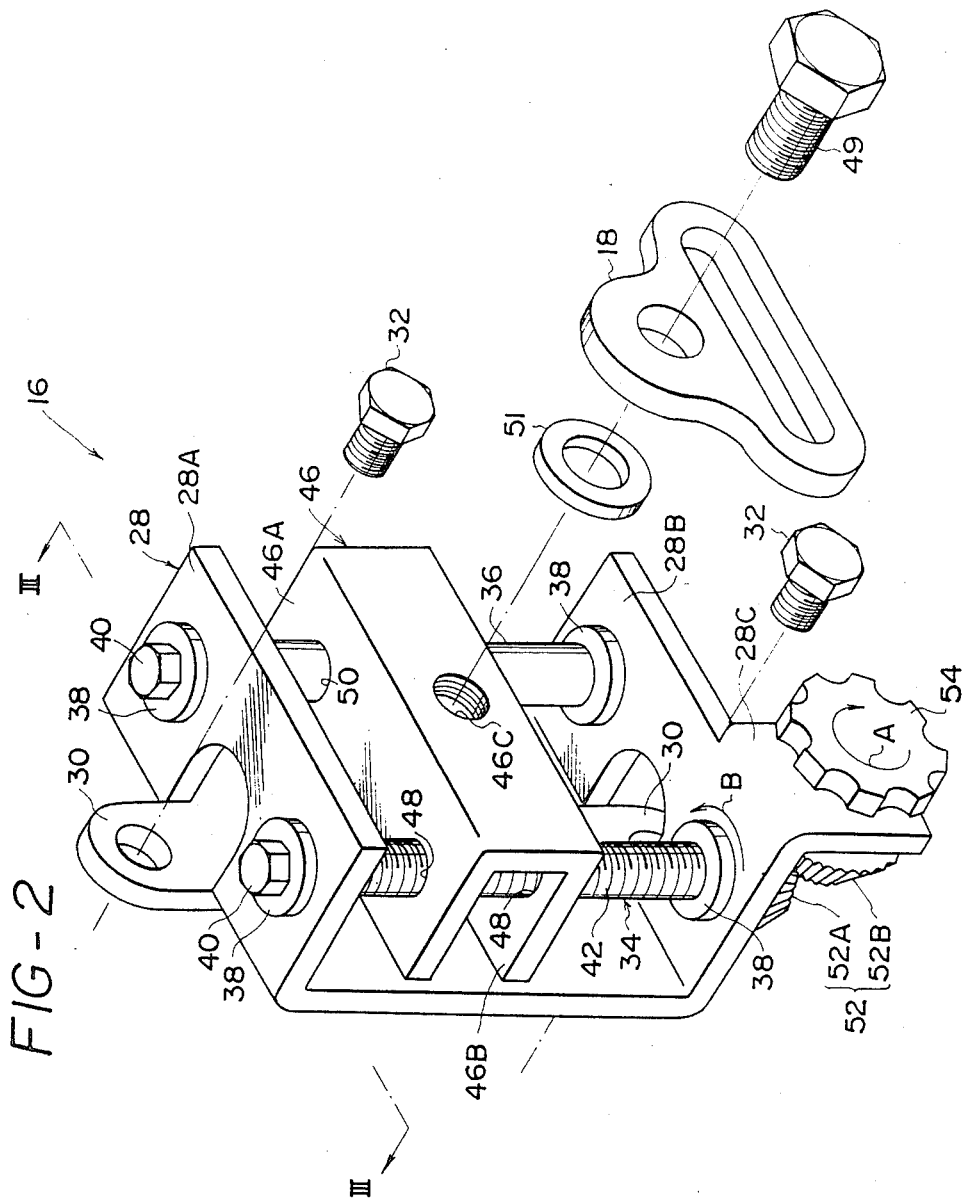
FIG. 2 is an exploded perspective view of the apparatus shown in FIG. 1.
Figure 3:
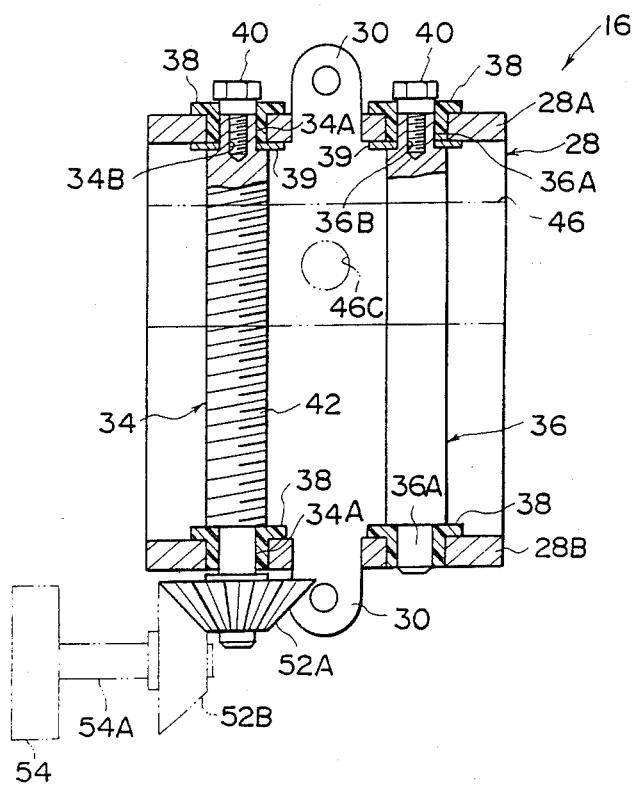
FIG. 3 is a sectional view taken along the line III—III in FIG. 2.

The webbing retaining position adjusting apparatus 16 by which the slip joint 18 is supported is shown in FIGS. 2 and 3 in more detail. As illustrated, flanges 30 are provided on a base member 28 at the upper and lower ends thereof in terms of the vertical direction of the vehicle. The flanges 30 are secured to the center pillar 10 (see FIG. 1) by respective bolts 32, so that any load which acts on the slip joint 18 when an emergency situation of the vehicle occurs can reliably be transmitted to the vehicle body.

Both upper and lower ends of the base member 28 are bent at substantially right angles to provide leg plates 28A and 28B, respectively.

A main shaft 34 and a subsidiary shaft 36 which are columnar and extend parallel to each other are stretched between the leg plates 28A and 28B.

As shown in FIG. 3, smaller-diameter shaft portions 34A and 36A are formed at the respective ends of the main shaft 34 and the subsidiary shaft 36. The shaft portions 34A and 36A are rotatably supported by the leg plates 28A and 28B through respective spacers 38. A retaining ring 39 is inserted between the leg plate 28A and each of the smaller-diameter shaft portions 34A and 36A. Internal thread portions 34B and 36B are respectively provided in the ends of the main and subsidiary shafts 34 and 36 which are closer to the leg plate 28A. Stepped bolts 40 are respectively screwed into the internal thread portions 34B and 36B. Thus, the shafts 34 and 36 are prevented from coming out of the leg plates 28A and 28B.

An external thread 42 is formed on the outer periphery of the main shaft 34. A movable member 46 is stretched between the main and subsidiary shafts 34 and 36, the member 46 being fitted on the external thread 42 of the shaft 34 and the outer periphery of the shaft 36.

The upper and lower ends of the movable member 46 are bent such as to extend parallel to each other in the direction opposite to that in which the leg plates 28A and 28B of the base member 28 extend, thus providing leg plates 46A and 46B.

A pair of circular bores 48 and 50 are provided in each of the leg plates 46A and 46B in such a manner that the bores 48 and 50 in the leg plate 46A are coaxial with the bores 48 and 50, respectively, in the leg plate 46B. An internal thread which is brought into thread engagement with the external thread 42 is formed in each of the bores 48. The bores 50 rotatably support the subsidiary shaft 36.

Since the main shaft 34 is prevented from moving in the axial direction thereof, the movable member 46 which is in thread engagement with the external thread 42 moves along the axis of the main shaft 34 in response to the rotation of the shaft 34.

An internal thread 46C is provided in the movable member 46 in such a manner that the axis of the internal thread 46C extends parallel to the direction in which the leg plates 46A and 46B extend. The slip joint 18 is rotatably supported by means of a bolt 49 which is screwed into the internal thread 46C through a spacer 51.

Thus, as the main shaft 34 is rotated, the slip joint 18, together with the movable member 46, is moved in the vertical direction of the vehicle, whereby it is possible to adjust the webbing retaining position such that the occupant 22 seated in the seat 20 is fastened by the webbing 14 at an optimum position (see the imaginary line shown in FIG. 1).

The smaller-diameter shaft portion 34A formed at the lower end (closer to the leg plate 28B) of the main shaft 34 is extended so as to project downwardly from the leg plate 28B, and this projecting portion is connected to a rotating means.

The rotating means includes bevel gears 52A, 52B and a knob 54. The bevel gear 52A is secured to the smaller-diameter shaft portion 34A of the main shaft 34, and the bevel gear 52B is secured to a shaft 54 (see FIG. 3) of the knob 54 which is rotatably supported by a flange 28C extending from the leg plate 28B. It should be noted that the respective rotary shafts of the gears 52A and 52B are meshed with each other at substantially right angles, and the mutual rotary shaft of the gear 52B and the knob 54 which is shown by the imaginary line in FIG. 3 actually extends in a direction perpendicular to the axis of the illustrated shaft 54A.

Accordingly, as the knob 54 is turned in the direction of the arrow A shown in FIG. 2, the main shaft 34 is rotated in the direction of the arrow B in FIG. 2, thus causing the movable member 46 to move toward the lower end of the vehicle. When the knob 54 is turned counter to the direction of the arrow A shown in FIG. 2, the movable member 46 can be moved toward the upper end of the vehicle.

The following is a description of the operation of the above-described first embodiment.

When the occupant 22 seated in the seat 20 fastens the webbing 14, he engages the tongue plate 24 which is between the slip joint 18 and the anchor plate with the buckle device 26, whereby he can be brought into a three-point seatbelt fastened condition.

When an occupant whose body size is different from a normal one seats himself in the seat 20, the webbing retaining position can be adjusted by actuating the webbing retaining position adjusting apparatus 16.

The operation of the apparatus in such case will be described below.

To move the slip joint 18 toward the lower end of the vehicle, the knob 54 rotatably supported by the flange 28C of the base member 28 is turned in the direction of the arrow A shown in FIG. 2.

The rotational force of the knob 54 is transmitted to the main shaft 34 through the bevel gears 52A and 52B so as to rotate the shaft 34 in the direction of the arrow B in FIG. 2. Since the main shaft 34 is prevented from moving in the axial direction thereof, the movable member 46 which is in thread engagement with the external thread 42 on the main shaft 34 and which is rotatably supported by the subsidiary shaft 36 moves toward the lower end of the vehicle in response to the rotation of the main shaft 34 in the direction of the arrow B.

Accordingly, the vertical position of the slip joint 18 which is secured to the movable member 46 by the bolt 49 can be adjusted in a stepless way in accordince with the direction of turning of the knob 54, so that even an occupant whose body size is different from a standard one can select an optimum webbing fastening position.

When the occupant wants to move the slip joint 18 toward the upper end of the vehicle, it is only necessary for him to turn the knob 54 counter to the direction of the arrow A.

When an emergency situation of the vehicle occurs, a relatively large tension is generated in the webbing 14 by the inertia acting on the body of the occupant 22, and this tension is transmitted to the movable member 46 through the slip joint 18. Since the movable member 46 is supported by the main shaft 34 through a combination of the internal threads in the circular bores 48 and the external thread 42, there is no fear of the relative positions of the movable member 46 and the main shaft 34 being offset by the tension transmitted thereto, and it is also possible to bear a relatively large load.

A second embodiment of the webbing retaining position adjusting apparatus according to the present invention will be described hereinunder with reference to FIGS. 4 and 5.

Figure 4:
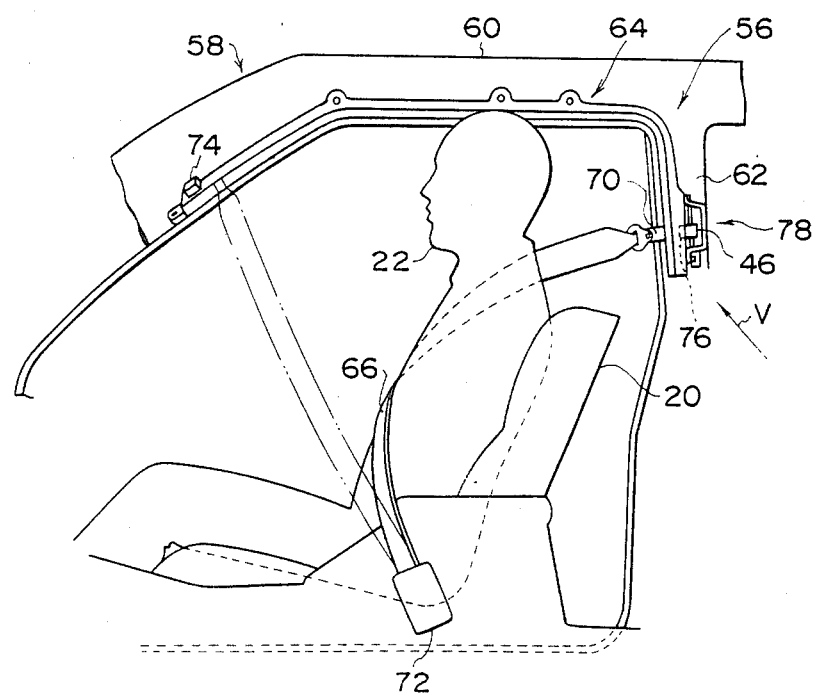
FIG. 4 is a front view of an automatic seatbelt system to which a second embodiment of the webbing retaining position adjusting apparatus according to the present invention is applied, as viewed from one side of the vehicle.

FIG. 4 shows an automatic seatbelt system 56 to which a second embodiment of the webbing retaining position adjusting apparatus according to the present invention is applied.

In this automatic seatbelt system 56, a guide rail 64 is secured to the body of a vehicle 58, the rail 64 being bent at right angles so as to extend along a roof side member 60 and a center pillar 62. A webbing 66 is moved along this guide rail 64 in the longitudinal direction of the vehicle 58, thereby allowing the webbing 66 to be automatically fastened to or unfastened from the body of the occupant 22.

A groove (not shown) is formed in the guide rail 64 for slidably receiving a slider 70, and one end of the webbing 66 is retained by this slider 70 moving along the groove.

The other end of the webbing 66 is wound up into a retractor 72 disposed in the center of the vehicle body. Thus, when the slider 70 is positioned at an end of the guide rail 64 which is closer to the front end of the vehicle 58, a space is produced between the webbing 66 and the seat 20, so that the occupant 22 can readily be seated in the seat 20 (see the imaginary line shown in FIG. 4).

When the occupant 22 seats himself in the seat 20, the slider 70 moves toward the rear end of the vehicle 58 and stops at a predetermined position on the guide rail 64 which extends on the center pillar 62, whereby the occupant 22 can be fastened by the webbing 66.

Maximum movable positions of the slider 70 toward the front and rear ends of the vehicle 58 are respectively detected by limit switches 74 and 76. The limit switch 74 for detecting a stop position of the slider on the front end side of the vehicle 58 is secured to the guide rail 64, and the limit switch 76 for detecting a stop position of the slider 70 on the rear end side of the vehicle 58, that is, a webbing fastening position, is secured to a movable member 46 of a webbing retaining position adjusting apparatus 78 which is rigidly secured to the guide rail 64.

Since the basic arrangement of the webbing retaining position adjusting apparatus 78 is similar to that of the first embodiment, description thereof is omitted, and differeces in arrangement therebetween will be explained below.

Figure 5:
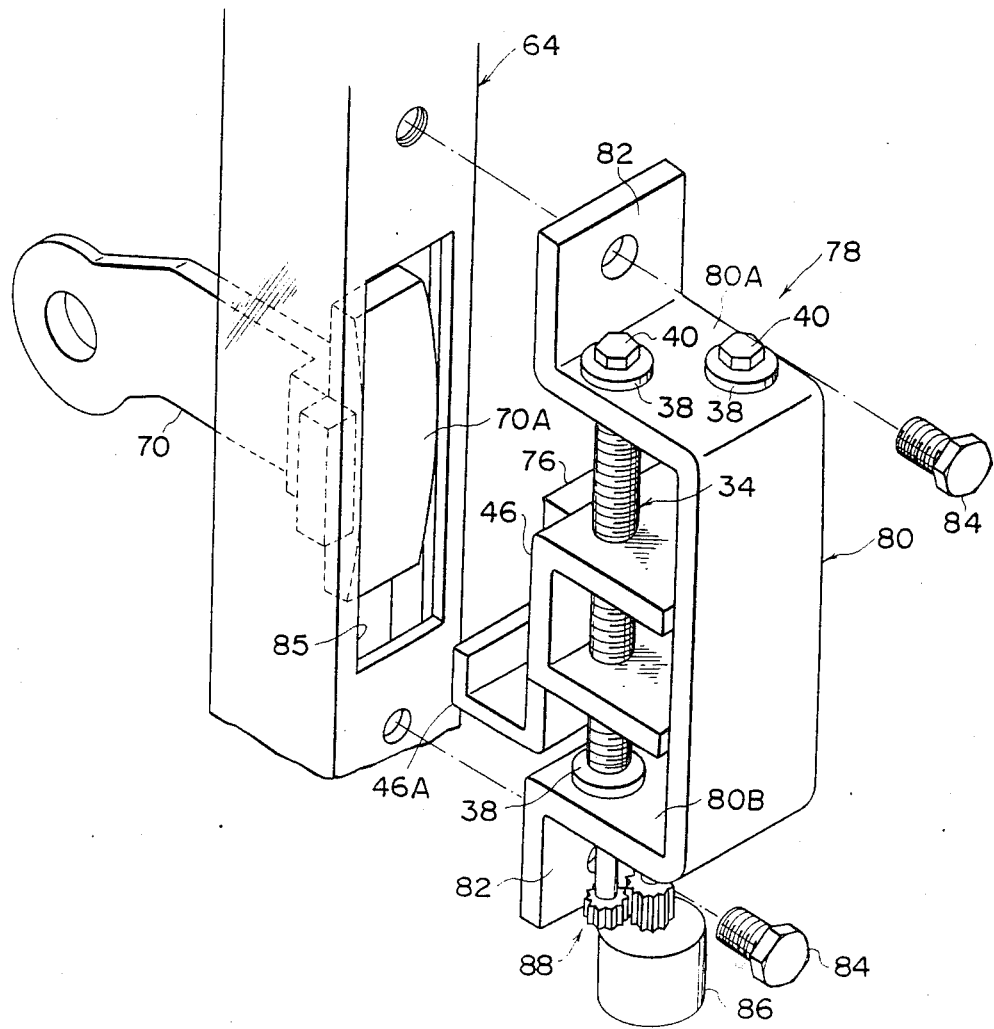
FIG. 5 is an exploded perspective view of an essential part indicated by the arrow V in FIG. 4.

As shown in FIG. 5, a base member 80 of the webbing retaining position adjusting apparatus 78 employed in this automatic seatbelt system 56 has flanges 82 which extend from the respective distal ends of leg plates 80A and 80B which extend parallel to each other. The flanges 82 are secured through respective bolts 84 to the surface of the guide 64 opposite to the surface thereof in which the groove is formed, that is, the surface of the guide rail 64 which is closer to the rear end of the vehicle 58.

An opening 85 is provided in a portion of the guide rail 64 between the flanges 82 so that a circular base portion 70A of the slider 70 is exposed through the opening 85. When the base portion 70A contacts a detecting arm (not shown) of the limit switch 76 secured to the movable member 46, the drive of the slider 70 is suspended.

At that time, the base portion 70A is also brought into contact with a support member 46A secured to the movable member 46, whereby the webbing tension which acts on the slider 70 is transmitted to the movable member 64.

Accordingly, if the movable member 46 is moved, in advance, to a predetermined position on the main shaft 34 in the axial direction thereof by a rotating means, it is possible to stop the slider 70 at a position corresponding to the predetermined position.

In this second embodiment, a motor 86 is employed as a rotating means. The drive shaft of the motor 86 and the main shaft 34 are connected through a pair of gears 88. In addition, the occupant 22 can rotate the motor 86 in both forward and backward directions as desired by actuating a switch (not shown).

When the occupant 22 seats himself in the seat 20, since the slider 70 has been positioned at the forward end (in terms of the longitudinal direction of the vehicle 58) by the driving force of the rotating means, he can readily be seated.

Before the slider 70 is moved toward the rear end of the vehicle 58, the motor 86 is rotated to move the limit switch 76 to a predetermined position, the switch 76 being secured to the movable member 46 which moves along the axis of the main shaft 34 in response to the rotatation of the motor 86.

Then, the slider 70 is moved along the guide rail 64. In consequence, the slider 70 can be stopped at a position corresponding to the limit switch 76.

Although in the second embodiment the position of the limit switch 76 is determined by adjusting its position by means of the rotation of the motor 86, it is also possible to provide the motor 86 with memory means such as a microcomputer whereby the position of the slider 70 at which it is stopped by the action of the limit switch 76 is automatically preset at an optimum position for each of the occupants mainly using the seatbelt system 56.

Although a combination of the bevel gears 52A, 52B and the knob 54 is employed as a rotating means in the first embodiment, the rotating means applied to the second embodiment, which is constituted by the motor 86 and the like, may also be employed in the first embodiment.

In addition, the base member 28 or 80 may be formed integral with the vehicle body or the guide rail 64, respectively.

As has been described above, the webbing retaining position adjusting apparatus according to the present invention comprises: a base member secured to the body of a vehicle; a main shaft rotatably supported by the base member and having an external thread formed on the outer periphery thereof; a subsidiary shaft secured to the base member and disposed so as to extend parallel to the main shaft; a movable member stretched between the main and subsidiary shafts and thread-engaged with the external thread such that the movable member is movable along the axis of the main shaft; positioning means secured to the movable member and adapted to determine a position at which the webbing is retained by the vehicle body; and rotating means for rotating the main shaft, whereby the position at which the webbing is retained by the vehicle body can be changed in accordance with the body size of each individual occupant.

What is claimed is:

1. An apparatus for adjusting the position of a webbing fastened to the body of an occupant with respect to the body of a vehicle, comprising:
    a base member secured to the vehicle body;
    a main shaft rotably supported by said base member and having an external thread formed on the outer periphery thereof along its longitudinal axis;
    a subsidiary shaft secured to said base member and disposed so as to extend parallel to said main shaft;
    a movable member slidably engaged to said subsidiary shaft and threadedly engaged with the external thread of said main shaft, said movable member being movable along the axis of said main shaft and guidable by said subsidiary shaft in response to the rotation of said main shaft;
    positioning means secured to said movable member and adapted to determine a position of the webbing with respect to the vehicle body; and
    rotating means for rotating said main shaft including a control knob and a bevel gear means operatively disposed between the main shaft and the control knob to conveniently orient the axis of rotation of the knob horizontally, whereby the positioning means secured to the movable member may be manually moved to any selected point along the longitudinal axis of the main shaft.

2. An apparatus according to claim 1, wherein said base member is secured to a center pillar of the vehicle body.

3. An apparatus according to claim 2, wherein said main and subsidiary shafts extends in a substantially vertical direction of the vehicle body, whereby the position of the webbing at which it is retained by the vehicle body can be adjusted in the vertical direction of the vehicle body.

4. An apparatus to claim 1, wherein said positioning means is a slip joint which slidably guides the intermediate portion of the webbing.

5. An apparatus according to claim 1, wherein said movable member has a pair of upper and lower leg plates, each of said main and subsidiary shafts being supported by said pair of leg plates.

6. An apparatus according to claim 5, wherein said movable member has an internal thread which is engaged with the external thread on said main shaft and a bore for receiving said subsidiary shaft.

7. An apparatus according to claim 5, wherein said main shaft extends through said leg plates, and said rotating means is attached to a projecting portion of said main shaft.

8. An apparatus according to claim 1, wherein said rotating means comprises:
    a first gear secured to the projecting portion of said main shaft;
    a second gear meshed with said first gear and having a shaft, and wherein said control knob is secured to the shaft of said second gear.

9. An apparatus for adjusting the position of a seatbelt webbing fastened to the body of an occupant with respect to the body of a vehicle, comprising:
    a base member secured to a center pillar of the vehicle body and having upper and lower leg plates;
    a main shaft rotatably supported by the leg plates of said base member and having an external thread formed on the outer periphery thereof, said main shaft extending vertically;
    a subsidiary shaft secured to the leg plates of said base member and extending vertically parallel to said main shaft;
    a movable member having an internal thread which is engaged with the external thread on said main shaft and a bore for slidably receiving said subsidiary shaft, said movable member being moved vertically by the rotation of said main shaft through the thread engagement therewith in accordance with the amount of rotation of said main shaft while being prevented from rotating around said main shaft by its slidable engagement with said subsidiary shaft;
    a guide member secured to said movable member and adapted to slidably guide the intermediate portion of said webbing;
    an actuating member connected to said main shaft for selectively rotating said main shaft;
    a guide rail extending from a roof side member to a center pillar of the vehicle body, and
    a slider for retaining said webbing which is movable along said guide rail and receivable within said movable member.

10. An apparatus according to claim 9, further comprising:
    a pair of limit switches for determining the front and rear limits, respectively, of the movement of said slider along said guide rail; and
    positioning means secured to said movable member and adapted to determine the position of the webbing with respect to the vehicle body, wherein said positioning means is formed by the limit switch that determines the rear limit of movement of said slider.

11. An apparatus according to claim 10, wherein said slider has a base portion which is received in a groove formed in said guide rail and which moves while being guided by said grove, said limit switch being disposed so as to be able to contact said base portion.

12. An apparatus according to claim 11, further comprising:
    a support member for supporting said base portion of said slider when said base portion contacts said limit switch.

13. An apparatus acoording to claim 9, wherein said guide rail is cut at a portion near the rear limit of movement of said slider so that the base portion of said slider is allowed to be exposed through the cut portion, said base member being secured at said cut portion.

14. An apparatus for adjusting the position of a seatbelt webbing fastened to the body of an occupant with respect to the body of a vehicle, comprising;
    a guide rail extending along a roof side member of the vehicle body and shaped so that a predetermined length of said guide rail extends vertically along a center pillar of the vehicle body;
    a slider for retaining the webbing that is movable along said guide rail;

a pair of limit switches for determining the front and rear limits, respectively, of the movement of said slider;

a base member secured to a portion of said guide rail near the rear limit of movement of said slider and having upper and lower leg plates;

a main shaft rotatably supported by the leg plates of said base member and having an external thread formed on the outer periphery thereof, said main shaft extending vertically;

a subsidiary shaft secured to the pair of leg plates of said base member and extending parallel to said main shaft in the vertical direction;

a movable member slidably engaged to said subsidiary shaft and threadably engaged with the external thread on said main shaft which includes the limit switch that determines the rear limit of movement of said slider, said movable member being moved vertically by the rotation of said main shaft through the threaded engagement therewith in accordance with the amount of rotation of said main shaft while being prevented from rotating by its engagement with said subsidiary shaft; and means for rotating said main shaft including a motor and gear means connected to the main shaft.

15. An apparatus for adjusting the position of a seatbelt webbing fastened to the body of an occupant with respect to the body of a vehicle, comprising:

a base member secured to a center pillar of the vehicle body and having upper and lower leg plates;

a main shaft rotatably supported by the leg plates of said base member and having an external thread formed on the outer periphery thereof, said main shaft extending vertically;

a subsidiary shaft secured to the leg plates of said base member and extending vertically parallel to said main shaft;

a movable member having an internal thread which is engaged with the external thread on said main shaft and a bore for slidably receiving said subsidiary shaft, said movable member being moved vertically by the rotation of said main shaft through the thread engagement therewith in accordance with the amount of rotation of said main shaft while being prevented from rotating around the main shaft by its slidable engagement with said subsidiary shaft;

a guide member secured to said movable member and adapted to slidably guide the intermediate portion of said webbing;

an actuating member connected to said main shaft for rotating said main shaft;

a guide rail disposed between a roof side member and a center pillar of the vehicle body;

a slider having a base portion which is slidably engaged to a groove in the guide rail for retaining the webbing;

a pair of limit switches for determining the front and rear limits, respectively, of movement of said slider along said guide rail, and a positioning means formed in part by said limit switch for determining the rear limit of the slider, wherein the rear limit switch is disposed so as to be contactable with the base portion of the slider, and the guide rail is cut at a portion near the rear limit of movement of the slider so that the base portion may be exposed and secured at the cut portion.

16. An apparatus for adjusting the position of a seatbelt webbing fastened to the body of a vehicle, comprising:

a base member secured to a center pillar of the vehicle body and having upper and lower leg plates;

a threaded main shaft vertically and rotatably supported by the leg plates of the base member;

a movably member threadedly engaged to the threaded main shaft and vertically movable when said main shaft is rotated;

a guide member secured to the movable member for slidably guiding the intermediate portion of the webbing;

a guide rail disposed between a roof side member and an outer pillar of the vehicle body;

a slider having a base portion which is slidably engaged to a groove in the guide rail for retaining the webbing;

a pair of limit switches for determining the front and rear limits, respectively, of movement of said slider along said guide rail, and a positioning means formed in part by said limit switch for determining the rear limit of the slider, wherein the rear limit switch is disposed so as to be contactable with the base portion of the slider, and the guide rail is cut at a portion near the rear limit of movement of the slider so that the base portion may be exposed and secured at the cut portion.

* * * * *